United States Patent
Grebel

(10) Patent No.: US 10,232,895 B2
(45) Date of Patent: Mar. 19, 2019

(54) FRONT SPOILER ARRANGEMENT WITH A FLOW GUIDING COMPONENT, WHICH IS SEPARABLE FROM THE MOVING ACTUATOR AS AN OVERLOAD PROTECTION

(71) Applicant: Röchling Automotive SE & Co. KG, Mannheim (DE)

(72) Inventor: Karsten Grebel, Bürstadt (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 53 days.

(21) Appl. No.: 15/584,284

(22) Filed: May 2, 2017

(65) Prior Publication Data
US 2017/0355403 A1 Dec. 14, 2017

(30) Foreign Application Priority Data
Jun. 13, 2016 (DE) ........................ 10 2016 210 407

(51) Int. Cl.
*B62D 35/00* (2006.01)
*B62D 37/02* (2006.01)

(52) U.S. Cl.
CPC ........... *B62D 35/005* (2013.01); *B62D 35/00* (2013.01); *B62D 37/02* (2013.01); *Y02T 10/82* (2013.01)

(58) Field of Classification Search
CPC ....... B62D 35/005; B62D 35/00; B62D 37/02
See application file for complete search history.

(56) References Cited

U.S. PATENT DOCUMENTS

| | | | |
|---|---|---|---|
| 6,799,858 B1 | 10/2004 | Boegelein | |
| 8,702,152 B1 | 4/2014 | Platto et al. | |
| 2010/0320332 A1* | 12/2010 | Voss | B64C 9/18 244/217 |
| 2013/0341110 A1* | 12/2013 | Butlin, Jr. | B62D 35/005 180/68.1 |
| 2014/0076645 A1* | 3/2014 | McDonald | B62D 35/005 180/68.1 |
| 2015/0091325 A1* | 4/2015 | Shiga | B62D 37/02 296/180.1 |
| 2017/0080986 A1* | 3/2017 | Yoon | B60R 19/48 |
| 2017/0158257 A1* | 6/2017 | Fahland | B62D 35/005 |

* cited by examiner

*Primary Examiner* — Lori L Lyjak
(74) *Attorney, Agent, or Firm* — Rankin, Hill & Clark LLP

(57) ABSTRACT

A front spoiler arrangement for a motor vehicle, comprising a support component, a flow guiding component, which is positioned on the support component in a movable way between a further retracted position and a further extracted position, a guiding formation, which guides the movement between the two positions and a moving actuator, which is coupled to the flow guiding component by way of a coupling element, the coupling element and at least one component of either the moving actuator and the flow guiding component are coupled to each other through a connection arrangement, which has a surmountable detent formation, which separates from each other two possible relative operating positions between a component and the coupling element, i.e. a normal operating position and an emergency operating position, wherein a retraction movement of the flow guiding component in the direction opposite to the further extracted position beyond a retracted end position is mechanically prevented.

17 Claims, 5 Drawing Sheets

FRONT SPOILER ARRANGEMENT WITH A FLOW GUIDING COMPONENT, WHICH IS SEPARABLE FROM THE MOVING ACTUATOR AS AN OVERLOAD PROTECTION

The present invention relates to a front spoiler arrangement for a motor vehicle, comprising a support component, a flow guiding component, which is positioned on the support component in a movable way between a further retracted position and a further extracted position, a guiding formation, which guides the movement between the two positions and a moving actuator, which is coupled to the flow guiding component by means of a coupling element.

BACKGROUND OF THE INVENTION

A front spoiler arrangement of the generic type is known from DE 10 2014 100 190 A1, for example. Front spoiler arrangements are normally used for improving the air resistance of the motor vehicle supporting the front spoiler arrangement through extracting or retracting the flow guiding component with respect to the vehicle body. Normally, the flow guiding components are positioned in front of the front wheels, so that they may advantageously influence the air flow to the front wheels in relation to air resistance of the motor vehicle.

In the further retracted position, the flow guiding component is less subject to an air flow flowing around the moving vehicle with respect to the further extracted position. It normally protrudes in the further retracted position less from the rest of the vehicle body with respect to the further extracted position.

One problem affecting these front spoiler arrangements is that the flow guiding component in the further extracted position is subject to collision risk with obstacles which may be present in normal road traffic, such as curbstones, litter, ice blocks or even small animals. To this end, in the past, solutions have been already proposed.

A known solution consists in that the flow guiding component is moved from the further retracted to the further extracted position only starting from a determined threshold speed, since above a certain threshold speed of approximately 60 km/h it is likely that the vehicle is running on a flat and obstacle free road, both in an urban environment, on a well-constructed connecting road and in a rural environment on a state road or highway. In this way a collision with typical obstacles during maneuvers like curbstone edges and similar may be avoided. This solution is widely employed, since the flow guiding component at lower driving speeds and consequently lower flow speeds has a negligible effect, and may therefore be omitted in the lower speed range.

It is also known to construct flow guiding components from elastic or even elastomeric material, so that in case of collision with an object when driving, they may yield due to deformation to the impulse-like collision forces, which have a very high peak value. This however has the drawback that at higher speeds, even without a collision, the flow dynamic loads on the flow component due to relative wind cause a deformation of the flow guiding components and therefore may negatively affect their flow guiding function.

It is also known to use pneumatic moving actuators which are coupled to the flow guiding component, so that in case of a collision between the flow guiding component and an object, the flow guiding component may perform, due to gas compression in the pneumatic actuator, a limited deviating or retracting movement. The object of yielding of the moving actuator of the front spoiler arrangement is however contrasting to the object of holding the flow guiding component, even at high driving speeds, securely in the further extracted position. Therefore, the deviating movement of the flow guiding component in this solution is very limited.

It is also known to provide a sliding coupling in the force and torque transmission path between the moving actuator and the flow guiding component, which in case of collision with obstacles slides over the extracted flow guiding component, therefore allowing a deviating movement of the flow guiding component to the further retracted position. Such a complex coupling is known from DE 199 53 484 A1, for example. These couplings usually require a lot of space both in the axial direction, around a rotating output shaft of the moving actuator, and in the corresponding radial direction.

SUMMARY OF THE INVENTION

It is an object of the present invention to provide an aforementioned front spoiler arrangement, so that it may protect the flow guiding component from the consequences of an undesired collision with an object, even at high driving speeds, in the further extracted position, without any high space requirements.

This object and others are achieved according to the invention by a front spoiler arrangement of the generic type, in which the coupling element and at least a component of either the moving actuator and the flow guiding component are coupled to each other by means of a connection device, which has a surmountable detent formation, which separates from each other two possible relative operating positions between a component and the coupling element, i.e. a normal operating position and an emergency operating position, wherein a retraction movement of the flow guiding component in the direction opposite to the further extracted position beyond a retracted end position is mechanically prevented.

According to the invention, the coupling element and the at least one component between the moving actuator and the flow guiding component in the connection arrangement adopt two different relative operating positions, i.e., a normal operating position, which is adopted, when the flow guiding component may be correctly moved between the further retracted and the further extracted operating position, and an emergency operating position, which is adopted after the flow guiding component has been subject to a sufficient collision load, such as to cause a deviation movement.

Both relative positions are separated only by a surmountable detent device, wherein the surmounting force required for overcoming the detent device, as a force threshold, may be set by corresponding configuration of the surmountable detent formation. In this way, by a corresponding configuration of the detent formation, depending on the respective shape of the flow guiding component, an overcoming force threshold may be set, which, in case of probable flow dynamic loads, is not reached, even at maximum speed, whereas when these loads are exceeded, causes the detent formation to be overcome.

The skilled in the art is provided, to this end, with various parameters for influencing the detent formation and the respective overcoming force threshold: a material with correspondingly low elastic modulus may be chosen, which may be deformed even at relatively low forces, and/or a detent formation shape may be selected in a way, that the deformation required for overcoming the detent is lower or higher and/or the deformable component supporting the detent formation may be configured in such a way that the deformation forces required for deforming the component portion supporting the detent formation are within a desired range. All these possibilities will be readily available to the skilled in the art, due to her specific knowledge in the field.

The advantage of the present invention lies not only in the simple and precise setting of the overcoming force threshold, by which the normal operating position is left and the emergency operating position is adopted, but also in the fact that for constructing the present front spoiler arrangement only slightly more installation space is required with respect to the case of a front spoiler arrangement without any detent formation. Moreover, no relatively moving and therefore relatively supported components are required, as in the case of using a sliding coupling.

In fact, in a simple and therefore preferred embodiment of an inventive front spoiler arrangement, no more components are required as when no overload protection of the flow guiding component is present. Therefore, a preferred front spoiler arrangement exactly comprises one integral coupling element between the moving actuator and the flow guiding component, in order to connect these components to each other for transmitting movement.

Due to the mechanical prevention of a retracting movement of the flow guiding component from the further extracted position beyond a retracted end position, it is possible, due to the surmountable shape of the detent formation, to return to the normal operating position between component and coupling element, starting from an adopted emergency position, in a very simple way, due to the fact that the flow guiding component is moved into the retracted end position and the moving actuator continues to be operated in the operating direction leading to the end position. Then, the moving actuator may provide a transition force required for overcoming the detent formation for transitioning from the emergency to the normal operating position, so that the detent formation is now overcome again in the opposite direction, as in the previous overloading, reaching the normal operating position again.

The component may in this case be the moving actuator or the flow guiding component or both, wherein it is usually sufficient to couple a component, i.e. the moving actuator or the flow guiding component, by means of the connection arrangement provided with the detent formation, to the coupling element.

The detent formation is preferably configured and positioned on the coupling element, which in a further preferred way is positioned, as a coupling rod between the moving actuator and the flow guiding component.

In order to allow that after an overload, normally after a collision of the flow guiding component during driving, sufficient deviation path is available for limit the overload and/or deviate from the colliding object, in a preferred embodiment of the invention, the movement clearance allowing a relative movement between the component and the coupling element in the emergency position is greater than in the normal operating position. The movement clearance between coupling element and the component in the normal operating position is preferably zero, so that the component and the coupling element in the normal position are preferably coupled to each other without any clearance. The movement clearance between the component and the coupling element in the emergency position is preferably a clearance in the transition direction from the normal to the emergency operating position, since the overload caused by a collision is directed in this direction and therefore a clearance in this direction can in particular lead to a reduction and limitation of the overload.

The transition direction from the normal to the emergency operating position is in general not corresponding to the collision direction, i.e. the direction in which an object collides with the further extracted flow guiding component. The transition direction is determined by the construction of the front spoiler arrangement and in particular by the guiding formation. In fact, since the flow guiding component is movable with respect to the support element only in the way allowed by the guiding formation, also the transition direction or movement may only be a direction or trajectory of movement allowed by the guiding formation, if the component is the flow guiding component, or at least a direction or trajectory of movement modified by the guiding formation, if the component is the moving actuator.

The flow guiding component may fundamentally perform a purely translational, combined translational and rotational or purely rotational movement between the further retracted and further extracted position. Preferably, for obtaining a simple construction and mounting, a rotational movement of the flow guiding component is preferred, as defined by the guiding formation, between respective operating positions. In this case, when the component is the flow guiding component, a transition movement takes place from the normal to the emergency position along a circular path, so that the transition direction is defined as a tangent to the circular path. The transition direction may in this case vary, depending from the respective position of the component with respect to the coupling element, up to the complete execution of transition from an operating position to the other, due to the curvature of the transition trajectory. Similar considerations apply for a combined translational and rotational movement of the flow guiding component with respect to the support element due to the rotational component of movement.

Since the connection arrangement is used for the connection between component and coupling element transmitting force and/or torque as well as movement, the connection arrangement is preferably provided with a component-side portion directly connected with the component and a coupling element-side portion directly connected with the coupling element. One of portions between the component-side and the coupling element-side portion defines an engagement region. The respective other portion of the component-side and coupling element-side portion defines an engagement portion. The engagement portion engages the engagement region for coupling the component with the coupling element. In order to provide a secure coupling between the component and coupling element transmitting a high force and torque, the engagement portion preferably penetrates through the engagement region. The engagement portion may be formed as a pin, for example.

The engagement portion preferably is a region surrounded by the respective portion defining the same, which however does not necessarily be completely surrounded.

The detent formation may provide a restriction of the engagement region and is positioned between a normal operating area of the engagement region, in which the engagement portion engages in the normal operating position, and an emergency operating area of the engagement region, in which the engagement portion engages in the emergency operating position.

The detent formation physically separates, in this embodiment, said areas of the engagement region from each other, wherein the emergency operating area for securing abovementioned movement clearance in the direction of a transition of the engagement portion from the normal operating area to the emergency operating area, may be longer than the normal operating area, so that the engagement portion in the emergency operating area may move in the direction or at least with a component in the direction of said transition with respect to the engagement region.

The overcoming force required for overcoming the detent formation may then be set also by the extension of the restriction.

Fundamentally, it may be desirable that for the transition from the normal to the emergency position a different overcoming force is required than for the opposite transition from the emergency to the normal operating position. Normally it is desirable that the overcoming force required for transition back to normal operating position is low, in order for the moving actuator to provide the same without any problem, whereas the transition force from the normal to the emergency operating position depends from the shape of the flow guiding component and from driving performance expected from the vehicle sporting the front spoiler arrangement. Therefore, according to a preferred embodiment of the present invention, the overcoming force required for a transition from the normal to the emergency position is greater than the overcoming force required for the transition in the opposite direction.

From a constructive point of view, this direction dependent operatively varying overcoming force may be obtained by the fact that the restriction has a differently steep rise from opposite directions in the direction of a transition from one area to the respective other.

For facilitating mounting of the inventive front spoiler arrangement, but also for a specific setting of a desired overcoming force at least for a transition from the normal to the emergency operating position it may be envisaged, that the engagement region is delimited by two mutually orthogonal legs opposite to a direction of a transition from an operating to the other operating position, which are connected to each other at one end and which, on the other end, form between them an insertion gap for inserting the engagement portion in the engagement region. Through the insertion gap at one end of the legs and the connection of the legs to each other at the other end of legs, it is possible to enlarge or restrict the insertion gap through elastic deformation of legs, wherein the force required for deforming the legs depends on the leg length, the leg transversal section and the leg material.

In order to facilitate mounting it may be envisaged that the insertion gap is formed at the longitudinal end of the engagement region, which is nearer to the normal operating area of the engagement region. In this way, the engagement portion may be introduced through the insertion gap in the engagement region directly in the normal operating area. In the frequent case that the longitudinal end provided with the insertion gap of the engagement region is also a longitudinal end of the coupling element, in the preferred position of the normal operating area nearer to the insertion gap, a larger longitudinal region of the coupling element is available for forming the emergency operating area and the corresponding movement clearance. In this way, due to an emergency operating area, which is long in the longitudinal direction of the coupling element, a longer deviation path of component in case of an undesired collision may be provided, which allows a secure deviation or return of the flow guiding component even in case of large colliding obstacles. In particular, when the coupling element is a coupling rod, an advantageously great length of the emergency operating area may be achieved.

In addition to a form fitting positioning of the engagement portion in the engagement region, the engagement portion may also be kept in the engagement region by applying a force, in particular in its normal operating area. To this end, in the above mentioned embodiment of the engagement region with two delimiting legs, the material and component elasticity of the component portion defining the insertion region may be used for exerting a clamping force on the engagement portion. In this way, for exerting a clamping force on the engagement portion, no further components are required. From a constructive point of view, it may be therefore envisaged that the insertion gap width is greater when the engagement portion engages the normal operating area, than when the engagement portion is not engaging the engagement portion. In this way, the insertion gap and therefore also the free width of the engagement region is increased at least in the normal operating area by inserting the engagement portion into the engagement region, against the elastic force provided by the legs.

Fundamentally, the engagement region may be defined by the component-side or the coupling element-side portion. The engagement region is preferably defined by the coupling element-side portion, so that the engagement region may be provided in a small and compact form on the component, therefore on the flow guiding component or on the moving actuator, for example as a coupling pin, preferably as a coupling pin extending between two mutually distanced support points. In the particularly preferred case of a simple integral coupling element, the engagement region is defined by the coupling element itself.

Fundamentally, the component supporting the engagement portion may also be either the flow guiding component or the moving actuator. In order to ensure a defined transmission of force between the moving actuator and the coupling element, the component provided with engagement portion is preferably the flow guiding component. In this way, the coupling element may be coupled with a form fit with the moving actuator without a clearance, for force and/or torque transmission.

In order to avoid damage to the front spoiler arrangement by conventional operation and/or to prevent an undesired functional failure of the arrangement, for instance because the moving actuator has disconnected the engagement portion during returning from emergency area to the normal operating area beyond the insertion gap, according to an embodiment of the invention it may envisaged that the moving actuator comprises an output element, which is movable between two dead points, and is coupled with the coupling element in order to transmit movement, wherein the output element is positioned in one of its dead points, when the flow guiding component is placed in its further extracted position. This is advantageous for force feedback of a collision of the flow guiding component with an object on the moving actuator.

In a less preferred embodiment, the dead center points may be provided by end positions of a linearly movable piston rod of a pneumatic or hydraulic moving actuator, for example a piston-cylinder arrangement. In order to reduce the space requirements of the moving actuator a rotational actuator is preferred, which comprises a crank shaft with a crank pin as the output element. The crank pin extends, as usual in the case of crank shafts, preferably in parallel to the rotational axis of the crank shaft, although at a radial distance from the same.

The crank shaft and the moving actuator, the guiding formation, the coupling element and the flow guiding component form a four-link transmission, in which the flow guiding component is rotatable only between its two positions: further retracted position and further extracted position.

Preferably, the further retracted end position of the flow guiding component, in which a reset of the engagement between the engagement portion and the engagement region in the normal operating position may automatically be performed by simple actuation of the moving actuator, is identical with the further retracted operating position. This does not necessarily be in this way.

Constructively, it may be envisaged that the retracting movement beyond the retracted end position is provided by a mechanical abutment, fastened to the support element, against which a reciprocal abutment of the coupling element or of the flow guiding component liftably abuts in the retracted end position of the flow guiding component, only in one extraction direction opposite the retraction direction, to the further extracted position.

The present invention also refers to a motor vehicle with a vehicle body and a front spoiler arrangement, as represented and embodied in the following. The vehicle body then provides the support element, on which the flow guiding component is received in a relatively movable way.

The present application also refers to the use of an aforementioned preferred coupling element, as a coupling element between a moving actuator, in particular a rotatable moving actuator, and a flow guiding component movable between two operating positions, in particular only in a rotatable way.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
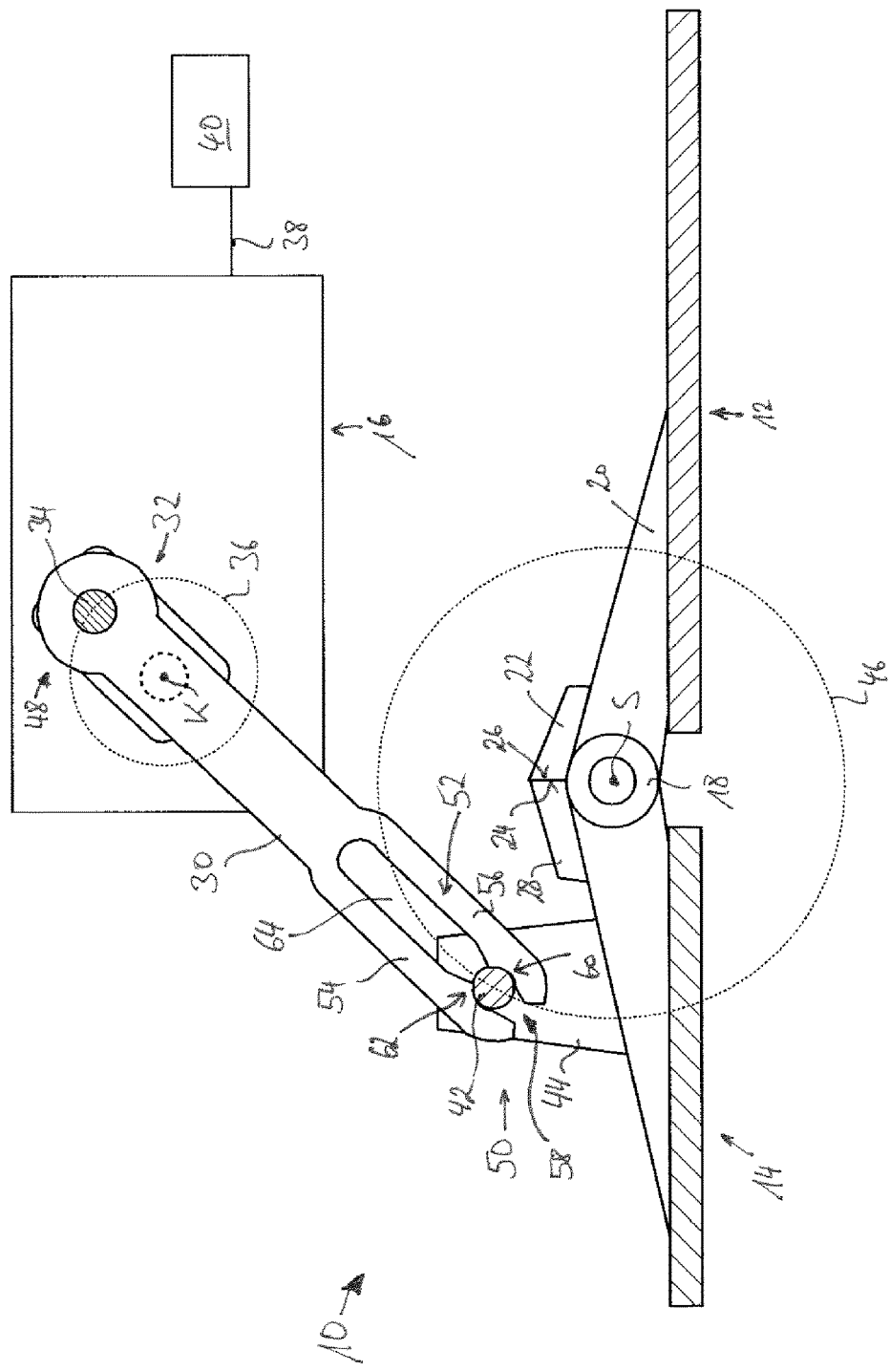
FIG. 1 shows a very schematic sectional view of an inventive front spoiler arrangement with the flow guiding component in the further retracted position, which is also a further retracted end position.

Referring now to the drawings wherein the showings are for the purpose of illustrating preferred and alternative embodiments of the invention only and not for the purpose of limiting the same, FIG. 1 shows a very schematic representation of the embodiment of an inventive front spoiler arrangement, which is generally identified by 10. This comprises a support component 12, for example a portion of a vehicle body, or a vehicle chassis, a flow guiding component 14 and a moving actuator 16 in the example of an electric motor.

The support component 12 forms a stationary reference point. On it a rotating support 18 is supported by a mount 20. The rotating support 18 forms a guiding formation, on which the flow guiding component 14 is configured to rotate about a rotational axis S which is perpendicular to the drawing's plane of FIG. 1.

An abutment element 22 is fixedly connected, to the support component 12 by means of mount 20, with an abutment surface 24, against which a counter-abutment surface 26 of a counter-abutment element 28, which is fixedly connected to the flow guiding component 14 abuts in the further retraced operating position of the flow guiding component 14 of FIG. 1. The position shown in FIG. 1 of flow guiding component 14 with respect to support component 12 is therefore also a further retracted end position, which cannot be exceeded in the retraction direction.

The moving actuator 16 formed by an electric motor also is fixedly connected to the support component 12. The moving actuator 16 comprises a dash-dotted only hinted crank shaft 32, which is positioned behind the coupling element 30, which is rotatable about a crank shaft axis K also perpendicular to the plane of FIG. 1.

The crank shaft 32 has a crank of a crank pin 34, which is also extending in parallel to the drawing plane of FIG. 1, however at a distance from the crank shaft axis K.

The center point of pin 34 rotates, during rotation of crank shaft 32, along a dash-dotted circle 36 around the crank shaft axis K.

The moving actuator 16 usually is connected by a line 38 with a control device 40, a microcomputer or an integrated circuit, for example, for transmitting signals, so that the moving actuator 16 may be operatively controlled by the control device 40.

Force, torque and movement of the moving actuator 16 are transmitted by a coupling element 30 formed by a coupling rod or bar to the flow guiding component 14.

The flow guiding component 14 has to this end a support pin 42, which is supported between two support sides 44 (FIGS. 1 to 5 represent only the support side 44 behind the drawing plane) connected for common movement with the flow guiding component 14 on the flow guiding component 14.

The support pin 42 of the flow guiding component 14 extends also perpendicularly to the drawing plane of FIG. 1. During rotation of the flow guiding component 14 with respect to the support component 12 around the rotation axis S, the center of the support pin 42 moves on the dot-dashed circle 46, wherein, due to construction, only a sector of the circle 46 is in fact run on by the support pin 42.

The coupling element 30 is coupled in a rotational way with its one longitudinal end 48 with a form fit to the crank pin 34 of the crank shaft 32. This coupling has no clearance.

The coupling element 30 defines at its opposite longitudinal end 50 an engagement region 52, through which the support pin 42 engages as an engagement portion.

The engagement region 52 is delimited perpendicular to the longitudinal direction of the coupling element 30 and to the longitudinal direction of the crank pin 34 by two legs 54 and 56 opposed to each other, which are connected to each other at their longitudinal ends, which are positioned nearer to the longitudinal end 48 of the coupling element 30, and which are provided between them with an insertion gap 58 at their longitudinal ends nearer to the longitudinal end 50 of the coupling element 30.

Legs 54 and 56 may therefore spring elastically from each other and to each other due to their material and component elasticity about their connecting longitudinal end, varying the width of the insertion gap 58, wherein the insertion gap 58 when the engagement region 52 is free from the support pin 42, preferably has a smaller gap width than when the support pin 42 is at least positioned in its normal operating position of FIG. 1 in a normal operating area 60 of the engagement region 52.

Figure 2:
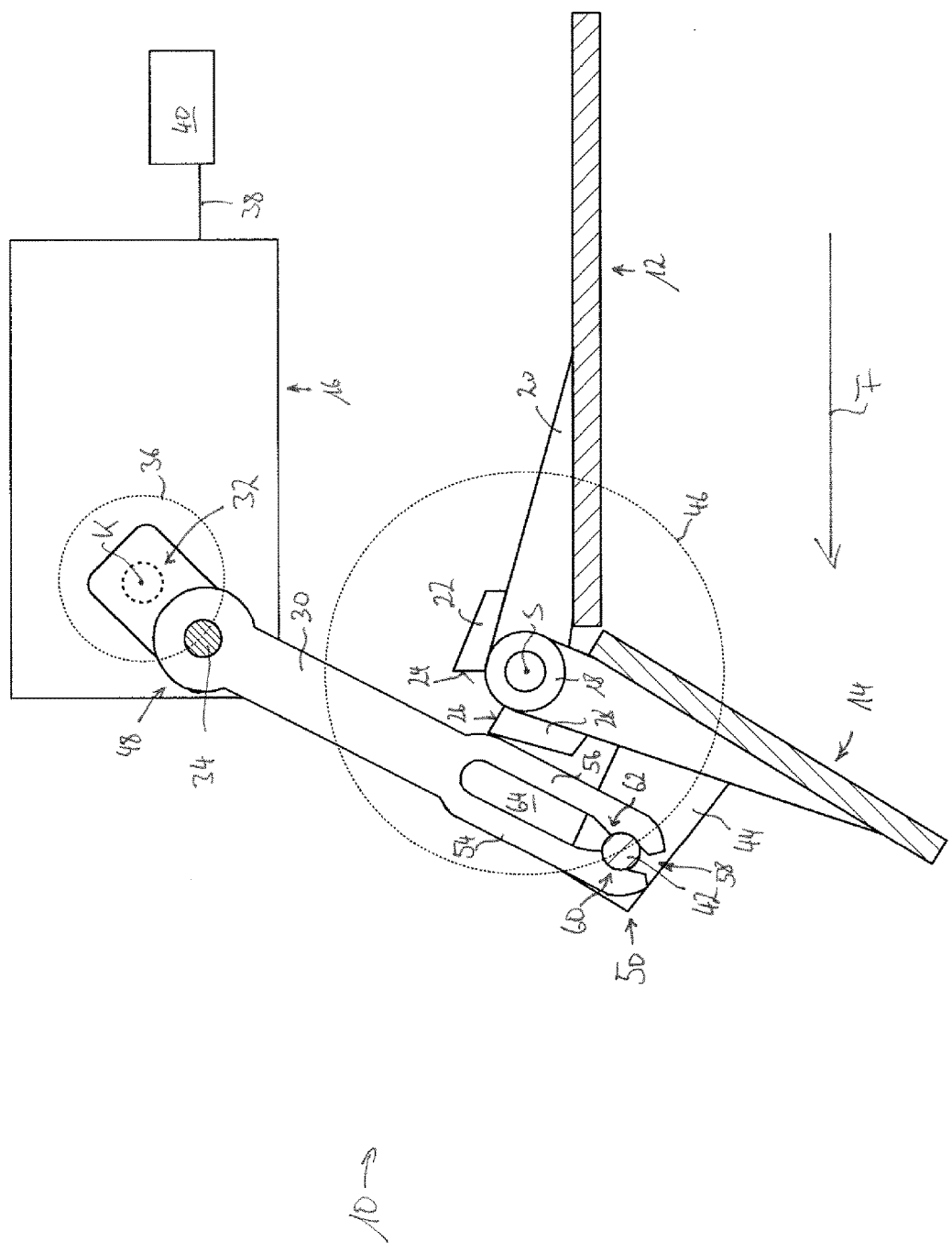
FIG. 2 shows a very schematic sectional view of FIG. 1 with the flow guiding component in the further extracted position.

The engagement region 52 has a detent formation 62 in the form of a local restriction, which separates the normal operating area 60, in which the support pin 42 is positioned in FIGS. 1 and 2, from an emergency operating area 64 of the engagement region 52.

Figure 3:
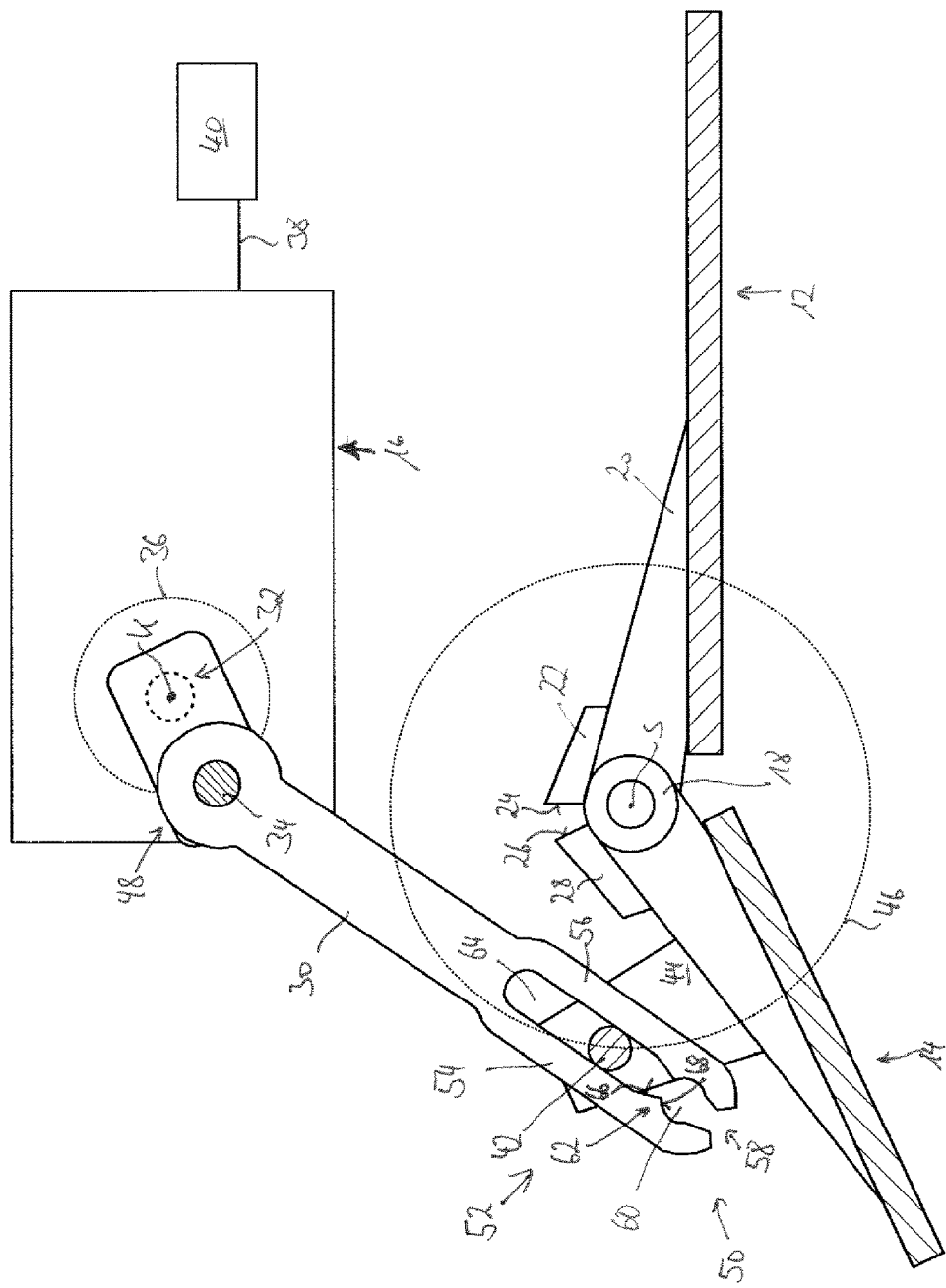
FIG. 3 shows a very schematic sectional view of FIG. 2 after a collision of the flow guiding component with an object.
Figure 4:
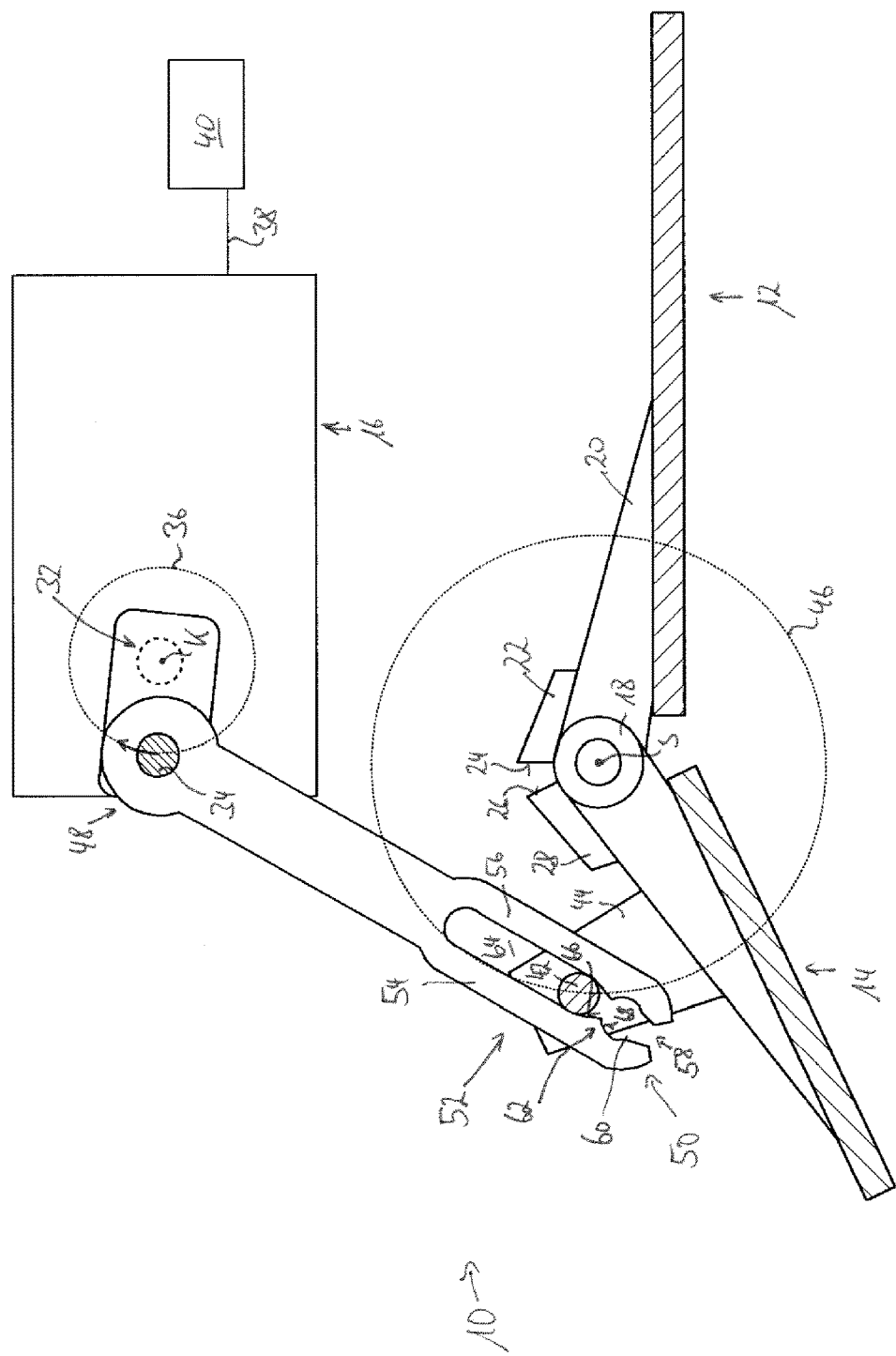
FIG. 4 shows a very schematic sectional view of FIG. 3 during a movement of the moving actuator back to a position, which corresponds to the further retracted end position
Figure 5:
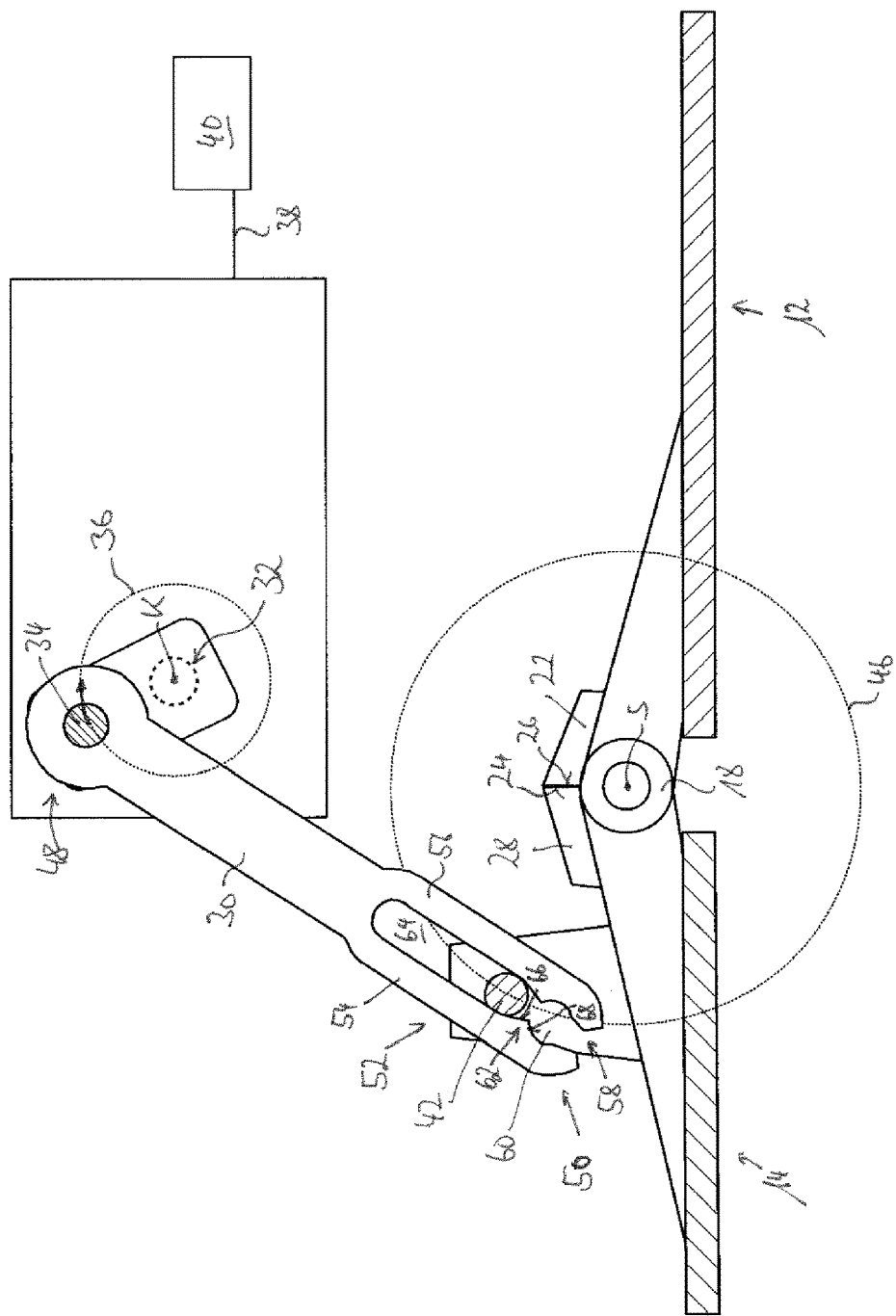
FIG. 5 shows the process of FIG. 4, wherein the moving actuator is further moved closer to its operating position, which corresponds to the further retracted operating position of the flow guiding component and is associated to it.

The detent formation 62 can be overcome due to the constructive configuration of the restriction as well as the elasticity of the legs 54 and 56 of the coupling element 30, wherein the force required for overcoming the same, during the transition from the normal operating position shown in FIGS. 1 and 2 and the emergency position shown in FIGS. 3 to 5, may be determined by dimensioning the restriction and the constructive configuration of the detent formation 62 as well as through the elasticity of the legs 54 and 56 in case of deformation to and from each other, and may be set by varying these parameters.

In FIG. 2, the front spoiler arrangement 10 of FIG. 1 is shown in the same perspective with a flow guiding component 14 set in a further extracted position. To this end, the crank shaft 32 with reference to position of FIG. 1 has traveled half a turn in a counterclockwise direction. The further extracted position of FIG. 2 of the flow guiding component 14 therefore also represents an end position of flow guiding component 14. The impact of relative wind takes place along arrow F. The support component 12 shown may be part of a vehicle underbody, for example.

Differently from FIG. 2, it is also preferred when the coupling element 30, when the flow guiding component 14 is in the further extracted position, adopts such an extended position with respect to the crank of the crank shaft 32, that the crank shaft axis K, the parallel longitudinal central axis of the crank pin 34 and the also parallel longitudinal central axis of the support pin 42 are in a same plane. In this case, an object colliding with the flow guiding component 14 and coming from the direction of arrow F cannot transmit any torque to the crank shaft 32.

The very schematic representation of FIG. 3 shows, in an otherwise unchanged position of other components of the front spoiler arrangement 10 according to the invention, an arrangement of the support pin 42 in the engagement area 46 of the engagement region 52 and therefore in the emergency operating position. This is the consequence of an overload acting on the flow guiding component 14 in the direction of arrow F, for example due to a collision with an object, which causes a displacement of the flow guiding component 14 in FIG. 3 in a clockwise direction.

The impact of an object during the collision with the flow guiding component is dynamically so strong, that the overcoming force determined by the detent formation 62 with expansion of the detent formation 62 through deformation of legs 54 and 56 away from each other is reached and exceeded, so that the support pin 42 now passes through the emergency operating area 64 of the engagement region 52.

The emergency area 64 is longer along the longitudinal direction of the coupling element 30 than the normal operating area 60, which holds with a form and clamping fit the support fit 42 when it passes through the same. In the position shown in FIG. 3 the support pin 42 is subject only to slight friction forces between the legs 54 and 56 on one side and the support pin 42 on the other side. Otherwise the support pin 42 may move freely in the emergency area 64. Due to gravity, the support pin 42 will however travel without other external influences always to the longitudinal end 50 of the coupling element 30.

As is shown in FIG. 3, the detent formation 62 is configured in such a way that the flank 66 on the side of the emergency area 64 rising to the normal area 60 is less steep than the flank 66 rising from the normal area 60 in the direction of the emergency area 64. In this way, it is possible that the opposing force, which is required for a transition of the support pin 42 from the normal area 60 to the emergency area 64 is higher than in the opposite direction. This is helpful, if—as shown in the following by FIGS. 4 and 5—the support pin 42 has to be reset in the normal operating position, i.e. passing through the normal operating area 60 of the engagement region 52, only by the moving actuator 16. To this end, the crank shaft 32 in FIGS. 1 to 5, is displaced in a clockwise direction back in the position of FIG. 1.

A relative intermediate position is reached in FIG. 4, wherein through gravity, the support pin 42 rests on the less steep flank 66 on the side of the detent formation 62 which is facing the emergency area 64.

In FIG. 5, the contact situation of support pin 42 on flanks 66 of detent formation 62 is the same as in FIG. 4, although the crank shaft 32 is rotated in a clockwise direction so that the counter-abutment surface 26 again abuts on the abutting surface 24. In this way, the flow guiding component 14 has again reached its further retracted end position, in which it is shown in FIG. 1. In the situation of FIG. 5, the movement of the crank shaft 32 in a clockwise direction has not ended yet. By continuing the rotational movement of the crank shaft 32 in a clockwise direction the coupling element 30 is further displaced with the crank pin 34. Since the flow guiding component 14 has already reached its further retracted end position and at that point it is fixed because of the described mechanical abutment, a relative movement between the coupling element and the support pin 42, along which the legs 54 and 56 by overcoming the detent formation 62, are elastically deformed away from one another and due to their elastic tension, snap again in a closed position, as soon the support pin 42 is received in the normal operating area 60 of the engagement region 52. Then, the position shown in FIG. 1 is again reached and the engagement situation between coupling element 30 and flow guiding component 14 is the normal operating position.

As is clearly shown in FIGS. 1 to 5, the mechanism shown for an overload-protected displacement of a flow guiding component of the front spoiler arrangement 10 according to the invention requires almost no additional mounting space than when the moving actuator 16 is connected by a conventional coupling rod without detent formation 62 with a form fit and without clearance with the support pin 42 of the flow guiding component 14.

With the proposed configuration it is however possible to provide a highly effective overload protection of the flow guiding component 14, without the need of again eliminate an emergency situation provided after a collision (see FIGS. 3 to 5) by particular measures. The usual function of the moving actuator is sufficient to restore the normal operating position.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A front spoiler arrangement for a motor vehicle, comprising a support component, a flow guiding component, which is positioned on the support component in a movable way between a further retracted position and a further extracted position, a guiding formation, which guides the movement between the further retracted position and the further extracted position and a moving actuator, which is coupled to the flow guiding component by a coupling element, the coupling element and at least one component out of the moving actuator and the flow guiding component are coupled to each other through a connection arrangement, which has a surmountable detent formation, which separates from each other two possible relative operating positions between the component and the coupling element, i.e. a normal operating position and an emergency operating position, wherein a retraction movement of the flow guiding component in the direction away from the further extracted position beyond a retracted end position is mechanically prevented.

2. The front spoiler arrangement according to claim 1, wherein a movement clearance allowing a relative movement between the component and the coupling element in the emergency operating position is greater than in the normal operating position.

3. The front spoiler arrangement according to claim 1, wherein the connection arrangement has a component-side portion directly connected with the component and a coupling element-side portion directly connected with the coupling element, wherein one portion out of the component-side portion and the coupling element-side portion defines an engagement region and wherein the respective other portion out of the component-side portion and the coupling element-side portion defines an engagement portion, which engages the engagement region for coupling the component and the coupling element, preferably passing through, wherein the detent formation forms a restriction of the engagement region and is positioned between a normal operating area of the engagement region, in which the engagement portion engages in the normal operating position, and an emergency area of the engagement region, in which the engagement portion engages in the emergency operating position.

4. The front spoiler arrangement according to claim 1, wherein a surmounting force required for overcoming the detent formation for transitioning between the two operating positions has a different value depending on the transition direction.

5. The front spoiler arrangement according to claim 4, wherein a first overcoming force required for a transition from the normal to the emergency operating position is greater than a second overcoming force required for the transition in the opposite direction.

6. The front spoiler arrangement according to claim 4, wherein the restriction rises with different steepness from opposing sides in the direction of the transition from one of the normal operating area and the emergency area to the other of the normal operating area and the emergency area.

7. The front spoiler arrangement according to claim 3, wherein the engagement region is delimited by two legs which oppose one another in a direction orthogonal to a direction of transition from one operating position to the respective other operating position, which two legs are connected to each other at one of their ends and at the other ends form between them an insertion gap for inserting the engagement portion into the engagement region.

8. The front spoiler arrangement according to claim 7, wherein the insertion gap is formed on a longitudinal end of the engagement region which lies nearer to the normal operating area of the engagement region.

9. The front spoiler arrangement according to claim 7, wherein an insertion gap width of the insertion gap is larger when the engagement portion engages in the normal area than when the engagement portion is not engaging the engagement region.

10. The front spoiler arrangement according to claim 3, wherein the engagement region is defined by the coupling element-side portion.

11. The front spoiler arrangement according to claim 3, wherein the engagement region is defined by the coupling element.

12. The front spoiler arrangement according to claim 1, wherein the component is the flow guiding component.

13. The front spoiler arrangement according to claim 1, wherein the moving actuator comprises an output element between two dead center points, which is movably coupled to the coupling element in a movement transferring manner, wherein the output element is in one of its dead centers, when the flow guiding component is in its further extracted position.

14. The front spoiler arrangement according to claim 13, wherein the moving actuator comprises a crank shaft with a crank pin as the output element.

15. The front spoiler arrangement according to claim 1, wherein the flow guiding component may be only rotated between the further retracted position and the further extracted position.

16. The front spoiler arrangement according to claim 1, wherein a retracting movement beyond the retracted end position is obtained by a mechanical abutment fixed to the support component, against which a counter-abutment of at least one of the coupling element and the flow guiding component abuts in the retracted end position of the flow guiding component liftable only in an extraction direction opposite to the retraction direction to the further extracted position.

17. A motor vehicle with a motor vehicle body and a front spoiler arrangement according to claim 1, wherein the flow guiding component is received on the vehicle body by the support element in a movable way, with respect to the vehicle body, between the further retracted position and the further extracted position.

* * * * *